United States Patent
Spurlock et al.

(10) Patent No.: US 7,737,948 B2
(45) Date of Patent: Jun. 15, 2010

(54) SPECKLE NAVIGATION SYSTEM

(75) Inventors: Brett A. Spurlock, Los Altos, CA (US);
Jahja I. Trisnadi, Cupertino, CA (US);
Steven Sanders, Belmont, CA (US);
Clinton B. Carlisle, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1098 days.

(21) Appl. No.: 11/313,133

(22) Filed: Dec. 20, 2005

(65) Prior Publication Data

US 2007/0139381 A1 Jun. 21, 2007

(51) Int. Cl.
*G09G 5/08* (2006.01)
(52) U.S. Cl. ...................................................... 345/166
(58) Field of Classification Search ................. 345/156, 345/157, 163, 166
See application file for complete search history.

(56) References Cited

U.S. PATENT DOCUMENTS

| | | | |
|---|---|---|---|
| 3,922,093 | A | 11/1975 | Dandliker et al. |
| 4,546,347 | A | 10/1985 | Kirsch |
| 4,560,881 | A | 12/1985 | Briggs |
| 4,751,380 | A | 6/1988 | Victor et al. |
| 4,799,055 | A | 1/1989 | Nestler et al. |
| 4,814,553 | A | 3/1989 | Joyce |
| 4,920,260 | A | 4/1990 | Victor et al. |
| 4,936,683 | A | 6/1990 | Purcell |
| 5,086,197 | A | 2/1992 | Liou |
| 5,288,993 | A | 2/1994 | Bidiville et al. |
| 5,345,527 | A | 9/1994 | Lebby et al. |
| 5,391,868 | A | 2/1995 | Vampola et al. |
| 5,473,344 | A | 12/1995 | Bacon et al. |
| 5,578,813 | A | 11/1996 | Allen et al. |
| 5,606,174 | A | 2/1997 | Yoshimura et al. |
| 5,627,363 | A * | 5/1997 | Paxman et al. ............ 250/208.1 |
| 5,644,139 | A | 7/1997 | Allen et al. |

(Continued)

FOREIGN PATENT DOCUMENTS

WO WO99/46603 A1 9/1999

(Continued)

OTHER PUBLICATIONS

International Search Report for International Application No. PCT/US06/47802 (2 sheets).

(Continued)

*Primary Examiner*—Richard Hjerpe
*Assistant Examiner*—Tom V Sheng

(57) ABSTRACT

One embodiment relates to a laser positioning device for sensing relative movement between a data input device and a surface by determining displacement of image features in a succession of images of the surface. The device forms a single integrated package, which includes a planar substrate and a transparent encapsulant that also embodies a collimating lens. Both a coherent light source and a sensor array and associated circuitry are configured on the planar substrate. Another embodiment relates to a method of sensing relative movement between a data input device and a surface. Coherent light is emitted from a laser and collimated so as to form a collimated illumination beam with a predetermined diameter, D, and a substantially uniform phase front. A speckle pattern is generated by impingement of the collimated illumination beam on the surface and detected by a sensor array. Other embodiments are also disclosed.

17 Claims, 4 Drawing Sheets

U.S. PATENT DOCUMENTS

| | | |
|---|---|---|
| D382,550 S | 8/1997 | Kaneko et al. |
| D385,542 S | 10/1997 | Kaneko et al. |
| 5,703,356 A | 12/1997 | Bidiville et al. |
| 5,729,008 A | 3/1998 | Blalock et al. |
| 5,729,009 A | 3/1998 | Dandliker et al. |
| 5,781,229 A | 7/1998 | Zediker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,034,760 A | 3/2000 | Rees |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,176,143 B1 | 1/2001 | Mo et al. |
| 6,195,475 B1 | 2/2001 | Beausoleil, Jr. et al. |
| 6,225,617 B1 | 5/2001 | Dandliker et al. |
| 6,233,368 B1 | 5/2001 | Badyal et al. |
| 6,256,016 B1 | 7/2001 | Piot et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,618,038 B1 | 9/2003 | Bohn |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,707,027 B2* | 3/2004 | Liess et al. .................. 250/221 |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 6,825,998 B2 | 11/2004 | Yoshida |
| 6,869,185 B2 | 3/2005 | Kaminsky et al. |
| 6,951,540 B2 | 10/2005 | Ebbini et al. |
| 7,042,575 B2* | 5/2006 | Carlisle et al. .............. 356/498 |
| 7,045,763 B2 | 5/2006 | Ballard |
| 7,161,582 B2* | 1/2007 | Bathiche et al. ............. 345/156 |
| 7,189,985 B2* | 3/2007 | Xie et al. ............... 250/559.29 |
| 7,205,521 B2* | 4/2007 | Gruhlke et al. ........... 250/206.2 |
| 7,221,356 B2* | 5/2007 | Oliver et al. ................ 345/166 |
| 7,227,531 B2* | 6/2007 | Lutian ........................ 345/163 |
| 7,248,345 B2 | 7/2007 | Todoroff et al. |
| 7,292,232 B2* | 11/2007 | Ranta et al. ................. 345/175 |
| 7,321,359 B2* | 1/2008 | Xie et al. .................... 345/163 |
| 7,435,942 B2* | 10/2008 | Lang ........................... 250/221 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2003/0058506 A1 | 3/2003 | Green et al. |
| 2003/0142288 A1 | 7/2003 | Kinrot et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0024624 A1 | 2/2005 | Gruhlke et al. |
| 2005/0083303 A1 | 4/2005 | Schroeder et al. |
| 2005/0094154 A1 | 5/2005 | Baney et al. |
| 2005/0109961 A1 | 5/2005 | Bittner et al. |
| 2005/0258346 A1 | 11/2005 | LeHoty et al. |
| 2005/0259078 A1 | 11/2005 | Roxlo et al. |
| 2005/0259097 A1 | 11/2005 | LeHoty et al. |
| 2005/0259098 A1 | 11/2005 | Trisnadi et al. |
| 2006/0187209 A1* | 8/2006 | Lai et al. .................... 345/166 |
| 2006/0279545 A1* | 12/2006 | Lan et al. .................... 345/166 |
| 2007/0109268 A1* | 5/2007 | Guo et al. ................... 345/166 |
| 2007/0146729 A1* | 6/2007 | Emtman et al. ............. 356/614 |

FOREIGN PATENT DOCUMENTS

| | | |
|---|---|---|
| WO | WO02/48853 A1 | 6/2002 |

OTHER PUBLICATIONS

International Written Opinion of the International Searching Authority dated Feb. 25, 2008 for International Application No. PCT/US06/47802; 4 pages.

USPTO Notice of Allowance for U.S. Appl. No. 11/124,858 dated Jan. 8, 2010; 7 pages.

USPTO Notice of Allowance for U.S. Appl. No. 11/124,858 dated Sep. 16, 2009; 9 pages.

USPTO Non-Final Rejection for U.S. Appl. No. 11/124,858 dated Oct. 8, 2008; 17 pages.

USPTO Non-Final Rejection for U.S. Appl. No. 11/124,858 dated Feb. 25, 2009; 23 pages.

1st Office Action for Korean Patent U.S. Appl. No. 10-2006-7026821 dated Apr. 28, 2008; 2 pages.

1st Office Action for China Patent U.S. Appl. No. 200580022643.5 dated Jan. 4, 2008; 14 pages.

USPTO Notice of Allowance for U.S. Appl. No. 11/128,988 dated Feb. 2, 2006; 7 pages.

R.E. Kalman, "A New Approach to Linear Filtering and Prediction Problems," Transactions of the ASME-Journal of Basic Engineering, Copyright 1960, Research Institute for Advanced Study; Baltimore, MD; 12 pages.

USPTO Notice of Allowance for U.S. Appl. No. 11/123,326 dated Jul. 9, 2007; 4 pages.

"The Examiner's Grounds for Rejection" from Korean Patent Office for Patent Application No. 10-2006-7026956; Dec. 31, 2007; 4 pages.

Written Opinion of the International Searching Authority for International Application No. PCT/US05/17462 dated Sep. 14, 2006; 6 pages.

USPTO Miscellaneous Action for U.S. Appl. No. 11/123,500 dated Jun. 8, 2005; 1 page.

USPTO Non-Final Rejection for U.S. Appl. No. 11/123,500 dated Apr. 11, 2008; 17 pages.

International Search Report of the International Searching Authority for International Application No. PCT/US2005/017459 dated Sep. 26, 2006; 2 pages.

International Search Report of the International Searching Authority for International Application No. PCT/US2005/017461 dated Nov. 23, 2006; 3 pages.

USPTO Non-Final Rejection for U.S. Appl. No. 11/123,527 dated Apr. 9, 2008; 18 pages.

USPTO Non-Final Rejection for U.S. Appl. No. 11/129,967 dated Dec. 6, 2006; 8 pages.

USPTO Final Rejection for U.S. Appl. No. 11/129,967 dated May 31, 2007; 8 pages.

USPTO Notice of Allowance for U.S. Appl. No. 11/129,967 dated Aug. 6, 2007; 4 pages.

USPTO Non-Final Rejection for U.S. Appl. No. 11/123,326 dated Mar. 21, 2007; 6 pages.

USPTO Non-Final Rejection for U.S. Appl. No. 11/123,527 dated Apr. 9, 2008; 18 pages.

USPTO Non-Final Rejection for U.S. Appl. No. 11/261,316 dated Jun. 6, 2006; 6 pages.

USPTO Notice of Allowance for U.S. Appl. No. 11/261,316 dated Aug. 23, 2006; 6 pages.

USPTO Miscellaneous Action for U.S. Appl. No. 11/123,326 dated Jun. 8, 2005; 1 page.

USPTO Miscellaneous Action for U.S. Appl. No. 11/123,525 dated Jun. 10, 2005; 1 page.

USPTO Non-Final Rejection for U.S. Appl. No. 11/582,776 dated Sep. 10, 2007; 8 pages.

USPTO Notice of Allowance for U.S. Appl. No. 11/582,776 dated May 16, 2008; 6 pages.

International Search Report of the International Searching Authority for Application No. PCT/US2005/017375 dated Oct. 2, 2006; 2 pages.

USPTO Non-Final Rejection for U.S. Appl. No. 11/123,525 dated Apr. 14, 2008; 20 pages.

* cited by examiner

SPECKLE NAVIGATION SYSTEM

TECHNICAL FIELD

The present invention relates generally to an Optical Positioning Device (OPD), and methods of sensing movement using the same.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, and such. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

One approach used for optical mice relies on a light emitting diode (LED) illuminating a surface at or near grazing incidence, a two-dimensional CMOS (complementary metal-oxide-semiconductor) detector which captures the resultant images, and software that correlates successive images to determine the direction, distance and speed the mouse has been moved. This technology typically provides high accuracy but suffers from a complex design and relatively high image processing requirements. In addition, the optical efficiency is low due to the grazing incidence of the illumination.

Another approach uses one-dimensional arrays of photo-sensors or detectors, such as photodiodes. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. An example of one such a mouse is disclosed in U.S. Pat. No. 5,907,152 to Dandliker et al. The mouse disclosed in Dandliker et al. also differs from the standard technology in that it uses a coherent light source, such as a laser. Light from a coherent source scattered off of a rough surface generates a random intensity distribution of light known as speckle.

Devices using the above-mentioned prior approaches typically have various disadvantages and drawbacks. For example, they are generally multi-component devices which are manufactured using separate components. The separate components typically include a light source, an illumination beam deviator, an integrated sensor array and circuitry, and a collection lens or other imaging optics.

The present application discloses a novel design for an optical positioning device. The disclosed design provides advantages over prior art devices in regards to reduced complexity, fewer components, and ease of manufacturing, while maintaining sufficiently accurate tracking of the device movement.

SUMMARY OF THE INVENTION

One embodiment relates to a laser positioning device for sensing relative movement between a data input device and a surface by determining displacement of image features in a succession of images of the surface. The device forms a single integrated package, which includes a planar substrate and a transparent encapsulant that also embodies a collimating lens. Both a coherent light source and a sensor array and associated circuitry are configured on the planar substrate.

Another embodiment relates to a method of sensing relative movement between a data input device and a surface. Coherent light is emitted from a laser and collimated so as to form a collimated illumination beam with a predetermined diameter, D, and a substantially uniform phase front. A speckle pattern is generated by impingement of the collimated illumination beam on the surface and detected by a sensor array.

Other embodiments are also disclosed.

BRIEF DESCRIPTION OF THE DRAWINGS

These and various other features and advantages of the present disclosure are understood more fully from the detailed description that follows and from the accompanying drawings, which, however, should not be taken to limit the appended claims to the specific embodiments shown, but are for explanation and understanding only.

DETAILED DESCRIPTION

Figure 1A:
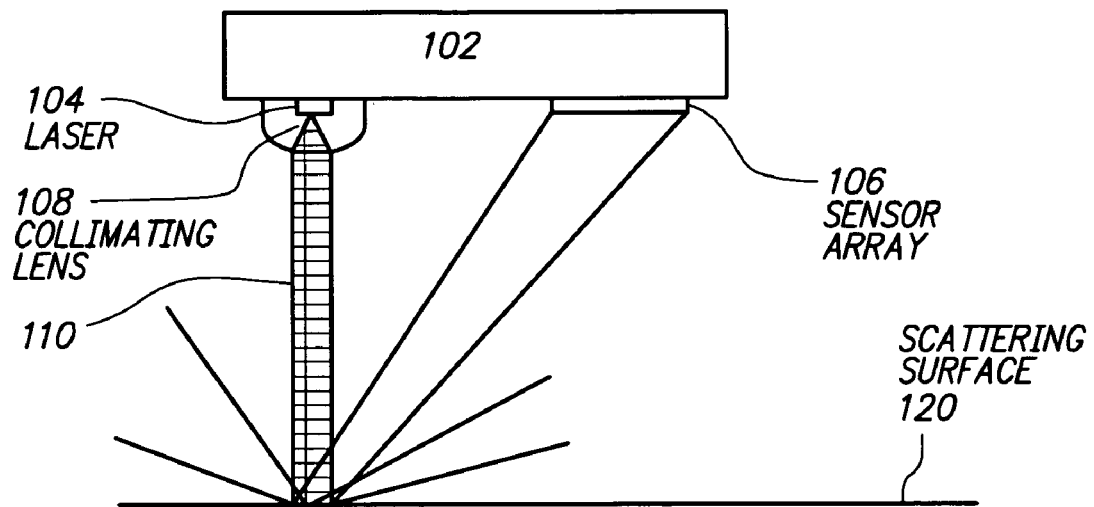
FIG. 1A is a cross-sectional diagram of a laser positioning device over a surface in accordance with an embodiment of the invention.
Figure 1B:
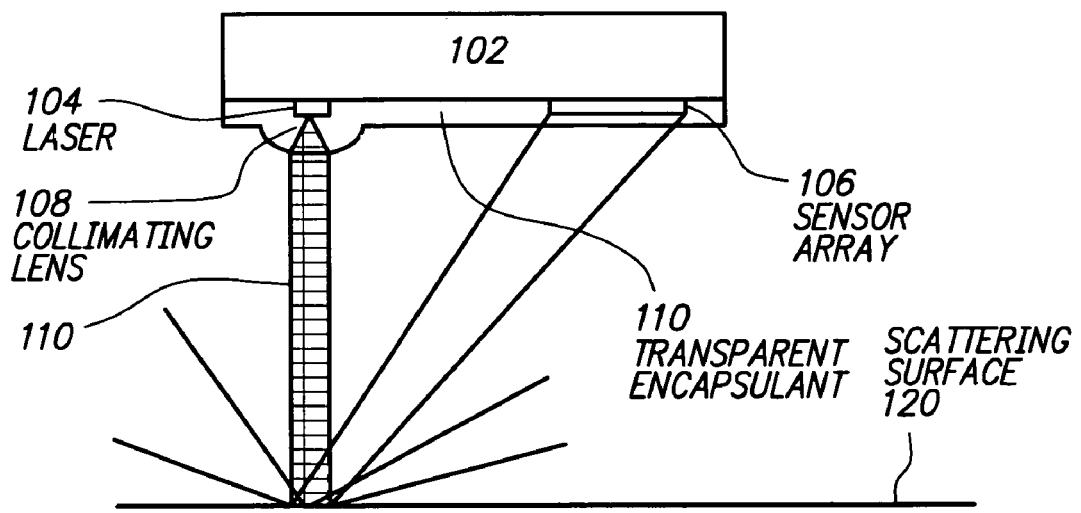
FIG. 1B shows a specific embodiment with a transparent encapsulant layer that embodies the collimating lens.

FIG. 1A is a cross-sectional diagram of a laser positioning device over a surface in accordance with an embodiment of the invention. As shown, the laser positioning device includes a planar substrate 102, a laser emitter 104, a sensor array 106, and a collimating lens 108. FIG. 1B shows a specific embodiment with a transparent encapsulant layer 110 that embodies the collimating lens 108. The encapsulant layer 110 also serves to protect the emitter 104 and the sensor array 106. In other embodiments, the collimating lens 108 may be plugged into a package covering the substrate 102, or may be part of a molded transparent plastic which covers the substrate 102, or may be implemented in other ways.

The laser positioning device may comprise, for example, a mouse device for user input into a computer system. The device may be constructed such that the planar substrate 102 is supported so as to lie parallel to the scattering surface 120 at a fixed distance. The device (and hence the planar substrate 102) may be moved laterally over the surface 120.

A laser emitter 104 is configured on the planar substrate 102. The laser 104 emits coherent light towards the scattering surface 120. In accordance with a preferred embodiment, a collimating lens 108 is configured in proximity to the laser 104 so as to receive the coherent light and to form a collimated illumination beam 110 therefrom.

The collimated illumination beam 110 has a predetermined diameter, D, and comprises a uniform phase front of the coherent light traveling towards the surface 120. Preferably, the collimated beam 110 is at a trajectory normal or near normal to the scattering surface 120. As can be seen in FIG. 1, no beam deviator component is necessary.

The collimated illumination beam 110 impinges upon the surface 120 and scatters light in approximately all directions in the reflective-side hemisphere. Due to such widely dispersed scattering, the particular placement of the sensor 106 becomes more flexible and less critical. In other words, the placement of the sensor 106 may be done with relatively loose tolerance which advantageously increases manufacturability of the laser positioning device.

Figure 6:
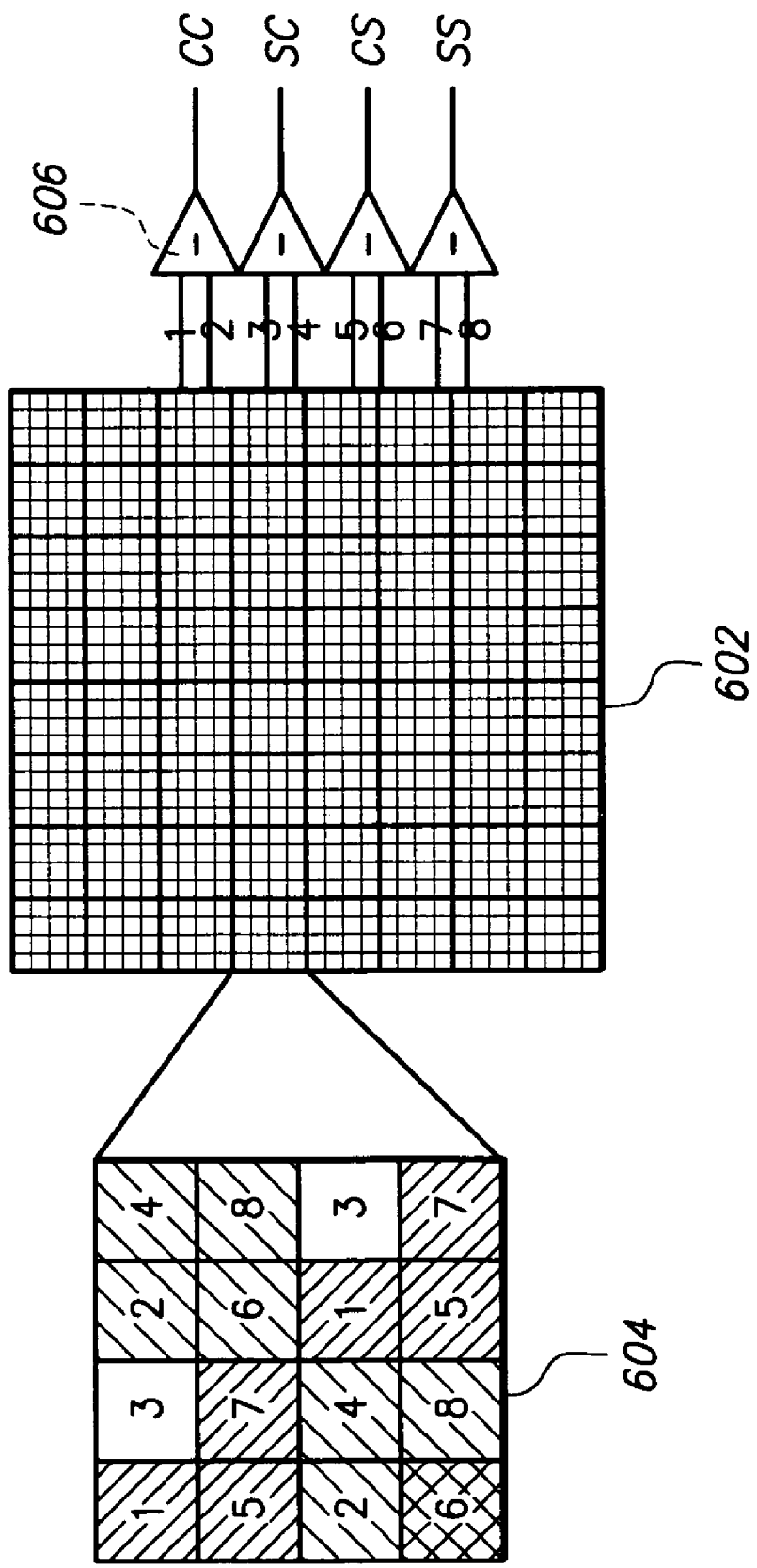
FIG. 6 is a schematic diagram of a two-dimensional comb array in accordance with an embodiment of the invention.

The sensor array 106 may be advantageously configured on the same planar substrate 102 as the laser 104. Furthermore, the sensor array 106 may comprise a two-dimensional comb array or other type of detector array. The two-dimensional comb array of sensing elements are grouped in a specific manner and associated circuitry. Signals from select groups of sensing elements may be combined to create group signals, and differential signals may be generated from the group signals so as to determine movement on a two-dimensional surface. An example of a two-dimensional comb is shown in FIG. 6 which is discussed further below.

In accordance with one embodiment of the invention, a collection lens or other imaging optics is not required to map the scattered light onto the sensor array 106. This advantageously simplifies manufacture of the device and reduces cost.

Circuitry associated with the sensor array 106 may be configured to capture successive image frames of detected signals from the scattered light. An image frame of the scattered light includes a pattern of optical features which is referred to as "speckle pattern."

For a small lateral displacement of the substrate 102 relative to the surface 120, the change in the speckle pattern is preferably dominated by pattern shift with a low level of speckle "boiling" (i.e. with little change of the pattern besides the shift). In accordance with an embodiment of the invention, this condition of having a low level of speckle boiling due to a lateral shift may be advantageously met because the collimated illumination beam 110 provides a uniform phase front.

In addition, the typical (for example, mean or median) size of a speckle feature in the speckle pattern is preferably matched to the periodicity of the groupings of elements in the comb array. In accordance with an embodiment of the invention, this condition of matching speckle size to comb array periodicity may be advantageously satisfied by configuring appropriately the predetermined diameter of the collimated illumination beam 110.

Figure 2:
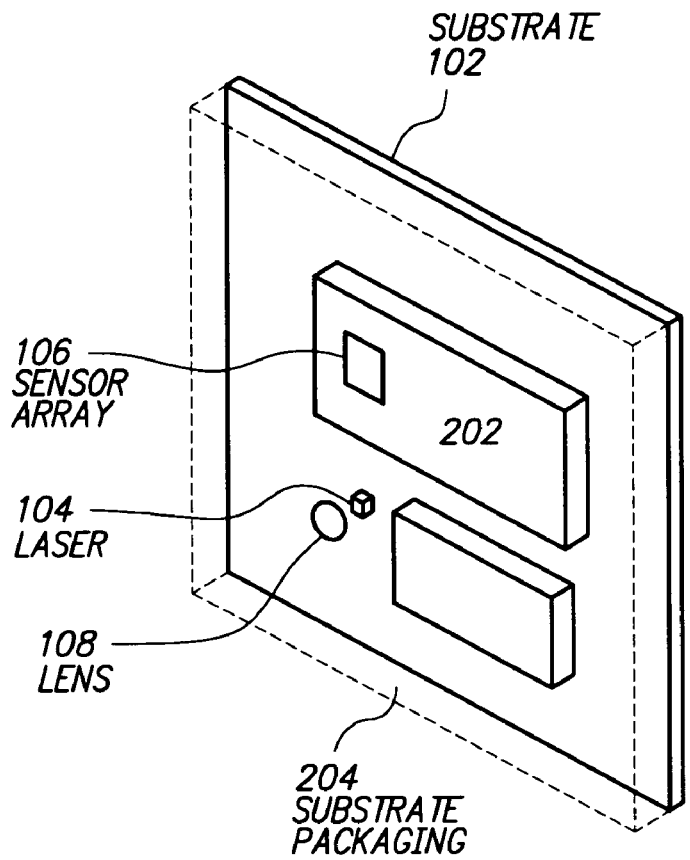
FIG. 2 is a perspective diagram of an integrated package for a laser positioning device in accordance with an embodiment of the invention.

FIG. 2 is a perspective diagram of an integrated package for a laser positioning device in accordance with an embodiment of the invention. As depicted, the laser 104 and the sensor array 106 are coupled to the substrate 102. The sensor array 106 may be part of a larger integrated circuit 202 which may include circuitry to process the detected signals and perform other operations.

Substrate packaging 204 may enclose the laser emitter 104 and the sensor array 106. In accordance with an embodiment of the invention, a collimating lens 108 may be integrated into the packaging 104 so as to be able to collimate the coherent light from the laser 104. Alternatively, the collimating lens 108 may be implemented as a miniature lens attached to a substrate package 104. A portion of the packaging in proximity to the sensor array 106 may be transparent so as to allow the sensor array 106 to detect the scattered light from the surface 120.

Figure 3:
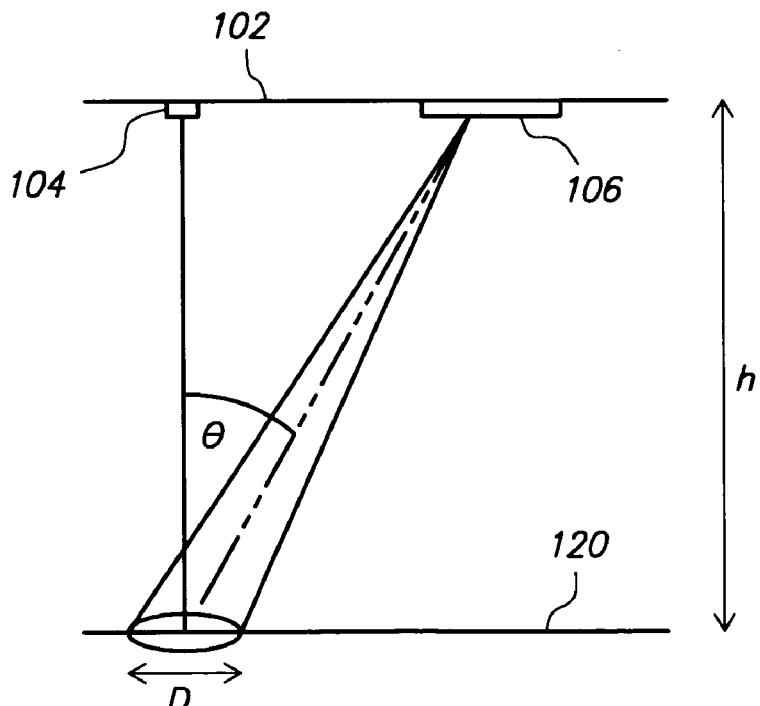
FIG. 3 is a cross-sectional diagram of the laser positioning device over the surface with certain dimensions and the angle θ indicated in accordance with an embodiment of the invention.

FIG. 3 is a cross-sectional diagram of the laser positioning device over the surface with certain dimensions and the angle θ indicated in accordance with an embodiment of the invention. The diagram illustrates the height, h, from the scattering surface 120 to the planar substrate 102. The diagram also illustrates the diameter, D, of the "footprint" of the collimated illumination beam 110 at the surface 120. As depicted, the angle θ is the angle between the trajectories of the illuminating beam 110 and of the scattered light from the surface 120 to a point on the sensor array 106, which, to a good approximation, may be represented by the sensor array center.

For comb-array detection, a suitable collimated beam diameter, D, is given by the following equation.

$$D = \frac{h\lambda}{\xi \Lambda \cos^2 \theta} \qquad \text{(Equation 1)}$$

In the above equation, h is the height from the planar substrate to the surface, λ is a wavelength of the coherent light, ξ is a fraction between 0.25 and 0.5, Λ is a period of the element groupings of the comb array (i.e. a predetermined multiple of the sensor pixel pitch), and θ is the angle subtended by the beam from a point on the sensor.

The matching condition for the speckle spatial frequency ν and the comb-array (inverse) period 1/Λ may be expressed as ν=1/Λ. Expressing the selected frequency as a fraction ξ (preferably between 0.25 and 0.5) of the cut-off frequency $\nu_{max}$=2 NA/λ, and using NA=sine of the half-angle subtended by the beam from a point on the sensor=D $\cos^2\theta$/(2h), leads to the above suitable beam diameter D per Equation 1. For example, with λ=850 nm, Λ=50 μm, h=5 mm, ξ=0.3, and θ=30°, the collimated beam diameter is D=0.38 mm.

Figure 4:
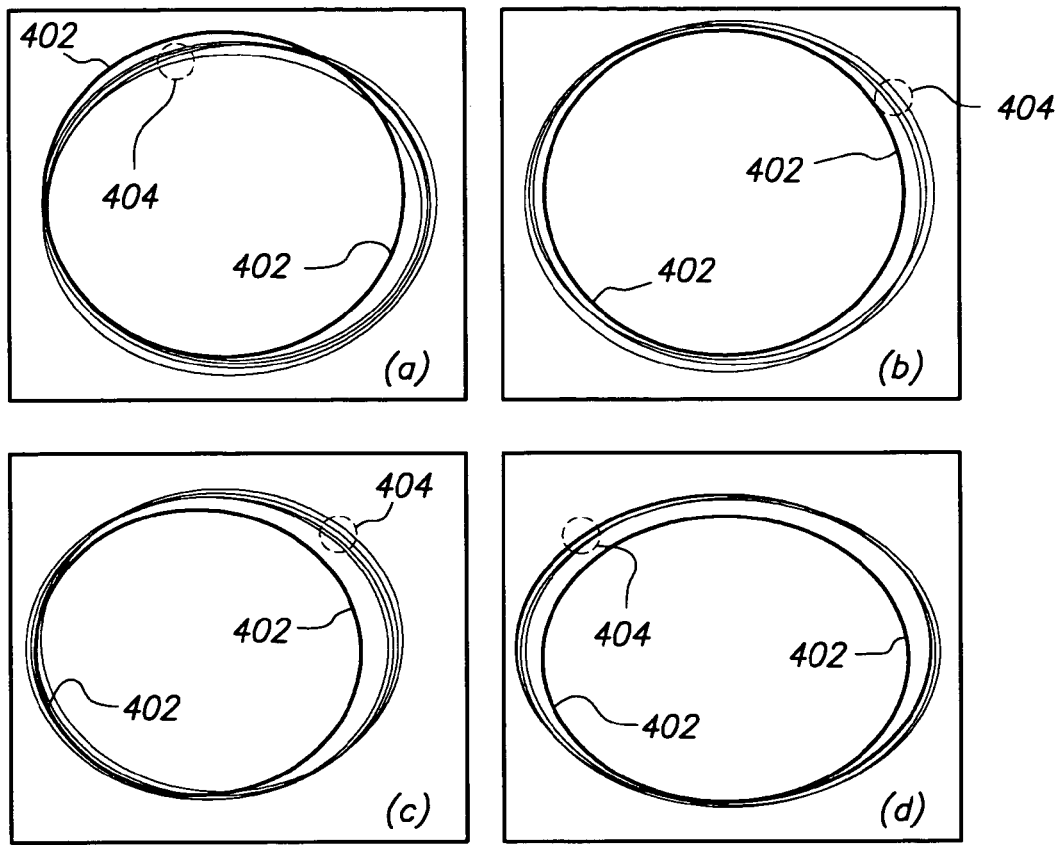
FIG. 4 are trace diagrams depicting the tracking of a circular motion at various speeds by a laser positioning device in accordance with an embodiment of the invention.

FIG. 4 are four trace diagrams (a, b, c, and d) depicting the tracking of a circular motion at various speeds by a laser positioning device in accordance with an embodiment of the invention. These trace diagrams were generated using a prototype experimental unit of the laser positioning device in accordance with an embodiment of the invention.

The motion tracked in each diagram comprised an approximately circular motion with a radius of approximately one centimeter. The reference circle trajectories 402 and the corresponding tracking traces 404 are shown in FIG. 4. In the upper left diagram labeled (a), the movement around the circle was at a speed of 1 cm/sec. In the upper right diagram labeled (b), the movement around the circle was at a speed of 10 cm/sec. In the lower left diagram labeled (c), the movement around the circle was at a speed of 25 cm/sec. In the lower right diagram labeled (d), the movement around the circle was at a speed of 40 cm/sec. As seen from each of the diagrams, the tracking of the movement was reasonably good at the various velocities.

The present disclose provides an integrated optical navigation system based on laser speckle. The system is advantageously integrated, compact and low profile, low-cost, buildable with loose tolerance, and optically efficient.

Co-planarity of the laser and the sensor advantageously enables integration of those components in a single planar package. Existing systems preclude co-planar packaging by their use of a beam deviator and/or optical geometry where the sensor is near the specular direction of the illumination.

Furthermore, the collimated illumination is used advantageously to create a speckle pattern that, with little "boiling" of the speckle, shifts when the mouse device is laterally displaced relative to the scattering surface. In addition, the normal angle of the illumination of the surface advantageously avoids any need for an illumination beam deviator, or any other additional optics, beyond the collimating lens.

The use of a two-dimensional comb-array sensor advantageously requires simple signal processing, low power consumption, and simple integrated circuit implementation.

Figure 5:
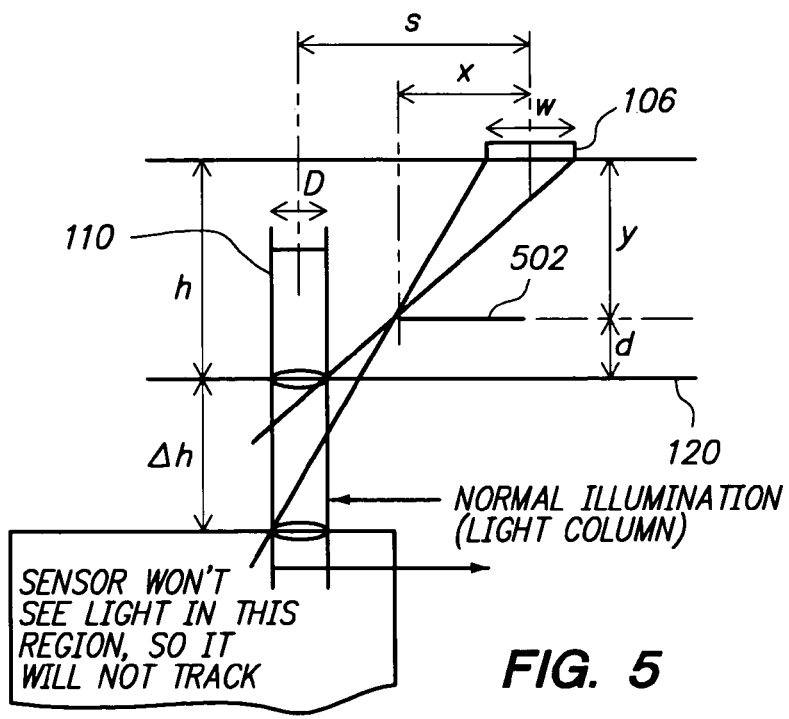
FIG. 5 is a cross-sectional diagram of a laser positioning device over a surface with a knife-edge for lift detection in accordance with an embodiment of the invention.

In a "mouse" type pointing device or similar applications, a lift detection mechanism is often desirable. A lift detection mechanism is a mechanism that causes the mouse device to stop tracking if lifted by more than a predetermined height, $\Delta h$, typically set at a value between one to five millimeters (1 to 5 mm). In the present disclosed system, lift detection may be implemented by an opaque knife-edge 502 that is placed to block the illuminated portion of the surface 120 from the sensor array's field-of-view if the mouse device is lifted by more than the predetermined height above the surface 120. The geometry of this arrangement is shown in FIG. 5. The location of the knife-edge 502 may be expressed in terms of the horizontal distance x and the vertical distance y from the sensor array center:

$$x = \frac{4hs + \Delta h(2s + w - D(h, s))}{4hw - 4hD(h, s) + 2\Delta h(2s + w - D(h, s))} \cdot w \quad \text{(Equation 2)}$$

$$y = \frac{2x + w}{2s + w - D(h, s)} \cdot h. \quad \text{(Equation 3)}$$

Referring to FIG. 5, $\Delta h$ is the maximum lift height, h the nominal distance from the sensor array plane to the surface, w the sensor array width, s the center-to-center separation between the sensor array and the laser, and d=h−y the distance from the knife-edge 502 to the surface 120. The illumination beam diameter at the surface D(h,s) depends on h and s and is given by Equation 1 with $\theta = \tan^{-1}(s/h)$. For example, given $\lambda = 850$ nm, $\Lambda = 50$ μm, h=5 mm, $\xi = 0.3$, s=3 mm, w=1 mm, and $\Delta h = 2.2$ mm, it is found that the collimated beam diameter D=0.385 mm, $\theta = 31°$, x=1.8 mm, y=3.5 mm, and d=1.5 mm.

FIG. 6 is a schematic diagram of a two-dimensional comb array in accordance with an embodiment of the invention. An example two-dimensional array 602 of detector elements is shown. The 2D array 602 is made up of 64 sub-arrays 604 organized in an 8-by-8 matrix. An expanded view of one such sub-array 604 is shown on the left side of the figure.

Each sub-array 604 comprises 16 detector elements organized in a 4-by-4 matrix. The 16 detector elements in each sub-array 604 are each identified as being a member of one of eight groups of elements. The group number associated with each detector element of each sub-array 604 is shown by the number (1, 2, 3, 4, 5, 6, 7, or 8) labeling the element in the expanded view. The signals from each group are electrically ganged together for the entire array 602. The resultant group signals (numbered 1 through 8) are output from the array 602 (as shown on the right side of the figure).

Differential circuitry 606 is used to generate differential signals from pairs of the group signals. A first differential signal CC is generated by the difference of signals 1 and 2. A second differential signal SC is generated by the difference of signals 3 and 4. A third differential signal CS is generated by the difference of signals 5 and 6. A fourth differential signal SS is generated by the difference of signals 7 and 8. These four differential signals contain the information of the in-phase and quadrature signals in the x and y directions.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of sensing relative movement between a data input device and a surface by determining displacement of optical features in a succession of images of the surface, the method comprising:

emitting coherent light from a laser;

collimating the coherent light so as to form a collimated illumination beam with a predetermined diameter, D, and is transmitted to the surface at a normal angle thereto;

generating a speckle pattern by impingement of the coherent light from the collimated illumination beam on the surface; and detecting the images of the surface using a sensor array comprising a comb array, wherein the laser and the sensor array are both configured on a same planar substrate that is configured to lie parallel to the surface, and the predetermined diameter, D, of the collimated illumination beam satisfies an equation D=(h $\lambda$)/($\xi$ $\Lambda$ $\cos^2\theta$), wherein h is a height from the planar substrate to the surface, $\lambda$ is a wavelength of the coherent light, $\xi$ is a fraction between 0.25 and 0.5, $\Lambda$ is a period of the comb array, and $\theta$ is an angle subtended by the beam from a point on the sensor.

2. The method according to claim 1, further comprising use of an opaque edge for lift detection.

3. The method according to claim 1, wherein, due to a substantially uniform phase front of the collimated beam, a small lateral displacement between the planar substrate and the surface results in a shift of a speckle pattern.

4. The method according to claim 1, wherein, due to the predetermined diameter of the collimated beam, a speckle size at the surface matches a period of the comb array.

5. A laser positioning device for sensing relative movement between a data input device and a surface by determining displacement of optical speckle in a succession of images of the surface, the device comprising:

a planar substrate;

a coherent light source configured on the planar substrate to shine a collimated illumination beam on the surface; and a comb array and associated circuitry configured on the planar substrate, wherein a predetermined diameter, D, of the collimated illumination beam satisfies an equation D=(h $\lambda$)/($\xi$ $\Lambda$ $\cos^2\theta$), wherein h is a height from the planar substrate to the surface, λ is a wavelength of the coherent light, ξ is a fraction between 0.25 and 0.5, Λ is a period of the comb array, and θ is an angle subtended by the beam from a point on the sensor.

6. The laser positioning device of claim 5, wherein the comb array receives light forming an image of the surface without use of a collection lens.

7. The laser positioning device of claim 5, wherein the collimating lens is embodied as one of the following: a) part of a transparent encapsulant which covers the planar substrate; b) part of a molded transparent plastic which covers the planar substrate; or c) a small lens that is plugged into a package covering the planar substrate.

8. The laser positioning device of claim 5, further comprising an opaque edge for lift detection.

9. The laser positioning device of claim 8, wherein the edge is placed so as to block an illuminated portion of the surface from a field of view of the sensor array if the device is lifted by more than a predetermined height above the planar substrate.

10. The laser positioning device according to claim 5, wherein the collimating lens is configured to receive coherent light from the coherent light source and to provide a collimated illumination beam which is transmitted to the surface at or near a normal angle to the surface.

11. The laser positioning device according to claim 10, wherein, due to uniformity of a phase front of the collimated beam, a small lateral displacement between the planar substrate and the surface results in a shift of a speckle pattern with minimal boiling.

12. The laser positioning device according to claim 5, wherein, due to the predetermined diameter of the collimated beam, a speckle size at the surface matches a period of the comb array.

13. The laser positioning device according to claim 5, wherein a transparent encapsulant covers the coherent light source and sensor array.

14. The laser positioning device according to claim 13, wherein the transparent encapsulant is part of a package in which the laser positioning device is packaged.

15. A laser positioning device comprising:
  a substrate with a light source configured thereon;
  a collimating lens between the light source and a surface over which the device is positioned to illuminate the surface with an illumination beam;
  a sensor array configured on the substrate, the sensor array having a field of view of the illuminated surface; and
  a lift detection mechanism that causes the device to stop tracking if the device is lifted from a nominal height distance (h) above the surface by more than a predetermined distance (Δh) above the surface, the lift detection mechanism comprises an opaque edge located a horizontal distance (x) from a center of the sensor array, parallel to a plane of the sensor array, given by the equation:

$$x = \frac{4hs + \Delta h(2s + w - D(h,s))}{4hw - 4hD(h,s) + 2\Delta h(2s + w - D(h,s))} \cdot w$$

where w is a width of the sensor array, s is a center-to center separation between the sensor array and the light source, and D(h,s) is a diameter of the illumination beam.

16. The laser positioning device according to claim 15, wherein the opaque edge is located a vertical distance (y) from the plane of the sensor array, given by the equation:

$$y = \frac{2x + w}{2s + w - D(h,s)} \cdot h.$$

17. The laser positioning device according to claim 15, wherein Δh is a predetermined distance between one to five millimeters.

\* \* \* \* \*